(12) United States Patent
Hornung et al.

(10) Patent No.: US 6,210,026 B1
(45) Date of Patent: Apr. 3, 2001

(54) LIGHT HOUSING WITH PIVOT ELEMENTS

(75) Inventors: Heinz Hornung, Kirchentellinsfurt (DE); Valère Logel, Paris (FR)

(73) Assignee: Sidler GmbH & Co., Tuebingen (DE)

( * ) Notice: Subject to any disclaimer, the term of this patent is extended or adjusted under 35 U.S.C. 154(b) by 0 days.

(21) Appl. No.: 09/277,753

(22) Filed: Mar. 29, 1999

(30) Foreign Application Priority Data

Mar. 31, 1998 (DE) .............................................. 198 14 224

(51) Int. Cl.$^7$ ...................................................... B60Q 3/02
(52) U.S. Cl. ........................ 362/490; 362/375; 362/282; 362/364
(58) Field of Search ..................................... 362/490, 374, 362/375, 493, 512, 282, 365, 364; 206/701; 220/4.02

(56) References Cited

U.S. PATENT DOCUMENTS 4,255,781 * 3/1981 Plemmons et al. ................... 362/374
5,172,976 * 12/1992 Bogdanovs ........................... 362/374
5,713,659 * 2/1998 Hillstrom et al. .................... 362/240

FOREIGN PATENT DOCUMENTS 41 14 509 A1   11/1992 (DE) .
0 524 830 A2   1/1993 (EP) .

* cited by examiner

Primary Examiner—Alan Cariaso
Assistant Examiner—Ronald E. Delgizzi
(74) Attorney, Agent, or Firm—Paul Vincent

(57) ABSTRACT

In order to easily install a light housing (1) in a simple and straightforward fashion into an installation opening, the light housing has an installation frame (2) having a frame opening (7) which can be installed from the front into the installation opening and with an insert member (3) which can be moved from a forward direction at least partially into the frame opening (7) and with at least one pivot element (4) born on the installation frame (2) which, in an outward pivot position, engages, with a seating surface (14), behind the wall of the installation opening and, in an inward pivot position, engages into the path of motion of the insert member (3) with an abutment surface (10) extending at an angle with respect to the seating surface (14). The entire light housing (1) is preferentially an injection-molded component.

8 Claims, 1 Drawing Sheet

LIGHT HOUSING WITH PIVOT ELEMENTS

BACKGROUND OF THE INVENTION

The present invention concerns a light housing for installation into an installation opening, in particular for a light in a motor vehicle.

In order to install a light or a light housing into an installation section (installation opening) in the ceiling of a motor vehicle, an additional metal frame is conventionally mounted in the ceiling in the vicinity of the installation opening. The light housing can e.g. then be mounted to this metal frame by means of a clipping connection. Release of this mounting, e.g. in order to exchange a light bulb, is not always as easy as desirable.

It is therefore the purpose of the present invention to create a light housing which can be installed into an installation opening without additional components (metal frames) in a simple, easy fashion.

SUMMARY OF THE INVENTION

This purpose is achieved in accordance with the invention in a manner which is surprisingly straight forward as it is effective in a light housing having an installation frame with a frame opening which can be inserted from the front into the installation opening and with an insert member which can be moved from a forward direction at least partially into the frame opening, and with at least one pivot element borne on the installation frame which, in an outer pivot position, engages, with a seating surface, behind the wall of the installation opening and, in an inner pivot position, engages into the path of motion of the insert member with an abutment surface disposed at an angle with respect to the seating surface.

The invention has the advantage, that the at least one pivot element can be pivoted via the insert member out of an inner pivot position initially penetrating into the frame opening in which it does not interfere with insertion of the installation frame into the installation opening, into its outer engaging pivot position while simultaneously being secured against pivoting back.

The firm clamping of the ceiling in the light housing between the pivot element and the installation frame serves for secure mounting of the light housing in the installation opening of the ceiling. The light housing in accordance with the invention can thereby also be mounted in a weak ceiling structure and utilized in a motor vehicle e.g. as an inner compartment illumination, a motor compartment illumination or a luggage compartment illumination.

The insert member is, in a preferred embodiment of the invention, borne for pivoting on the installation frame so that it can be pivoted into the frame opening. The insert member can, however, also be a separate component which can be inserted from the front into the frame opening.

It is particularly advantageous when the installation frame and the insert member are connected to each other via a film hinge. This facilitates a particularly economical manufacture of the installation frame and insert member from a single extruded component.

In accordance with an additional embodiment of the invention, the installation frame and the at least one pivot element are also connected to each other by means of a film hinge. This likewise facilitates the economical manufacture of the installation frame and the pivot element or elements from a single extruded component.

An additional advantageous embodiment provides that two pivot elements are disposed on the installation frame at opposite sides of the frame opening. In order for both of these pivot elements to simultaneously pivot via the e.g. pivoted-in insert member, the pivot axis of the at least one pivot element and the pivot axis of the insert member are preferentially at right angles with respect to each other.

In order to fix the insert member, e.g. pivoted into the frame opening, in that position at which it secures the pivot elements against pivoting back out of their engaging position, the pivoted-in insert member can be latched to the installation frame. After the latched connection has been released, the insert member can been pivoted-out. The light bulb, which is advantageously disposed in the installation frame, can then be replaced or the light housing can be removed from the installation opening.

In an improved embodiment of the invention, the at least one pivot element is an angle, one leg of which forms the seating surface and the other leg of which forms the abutment surface. Clearly, should the pivot element or pivot elements, already assume, after insertion of the installation frame into the installation opening, their engaging pivot position, they are no longer pivoted by introduction of the insert member.

Embodiments of the light housing are particularly advantageous with which the insert member is disposed on an illumination plate. This illumination plate covers at least the frame opening and also preferentially the installation frame.

In highly preferred embodiments of the invention, the entire light housing is made from one extruded component. This facilitates the extremely economical manufacture of the installation frame, insert member, and pivot element or elements as a single-piece extruded plastic component. The tool costs are particularly low, since a slide mechanism is not needed for manufacturing the light housing.

Further advantages of the invention can be extracted from the description and the drawing. The above features and those to be further described below can be utilized in accordance with the invention individually or collectively in arbitrary combination. The embodiments shown and described are not to be considered exhaustive enumerations, rather have exemplary character only for illustration of the invention.

The invention is represented in the drawing and described more closely in relation to an embodiment.

DESCRIPTION OF THE PREFERRED EMBODIMENT

Figure 1:
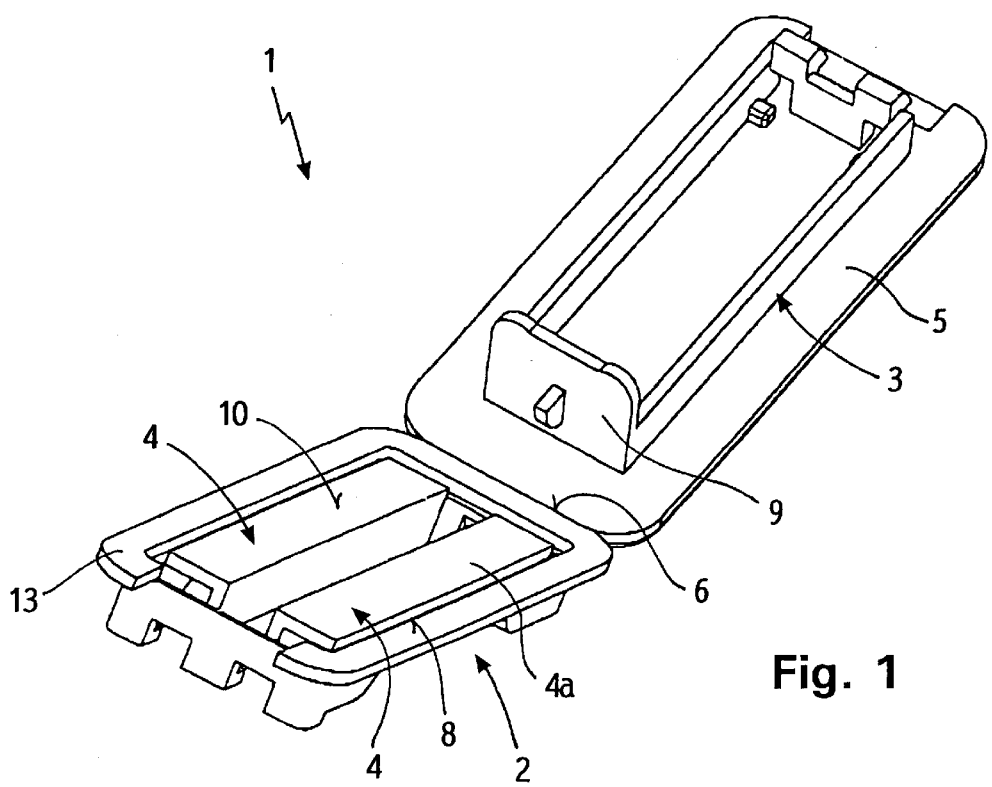
FIG. 1 shows the light housing in accordance with the invention in an opened state ready for installation having pivot elements penetrating into a frame opening.

The light housing 1 shown in the drawing can be mounted into an installation opening in the inside covering of a motor vehicle, e.g. into the installation section of the ceiling of the motor vehicle.

The single-piece light housing 1 comprises a rectangular installation frame 2 as well as as a frame-shaped insert member 3 and two pivot elements 4, each attached for pivoting to the installation frame 2. The insert member 3 is disposed on the inner side of an illumination plate 5 which is connected to the installation frame 2 via a film hinge 6 and can be pivoted into a frame opening 7 of the installation frame 2.

Each pivot element 4 is, in the embodiment, configured as a rectangular angle, one leg (the inner leg 4a) of which is connected to the installation frame 2 via a film hinge 8. Both pivot elements 4 are disposed opposite each other in the vicinity of the frame opening 7, wherein the pivot axes of the two film hinges 8 are parallel to each other and each at right angles with respect to the pivot axis of the film hinge 6.

Figure 2:
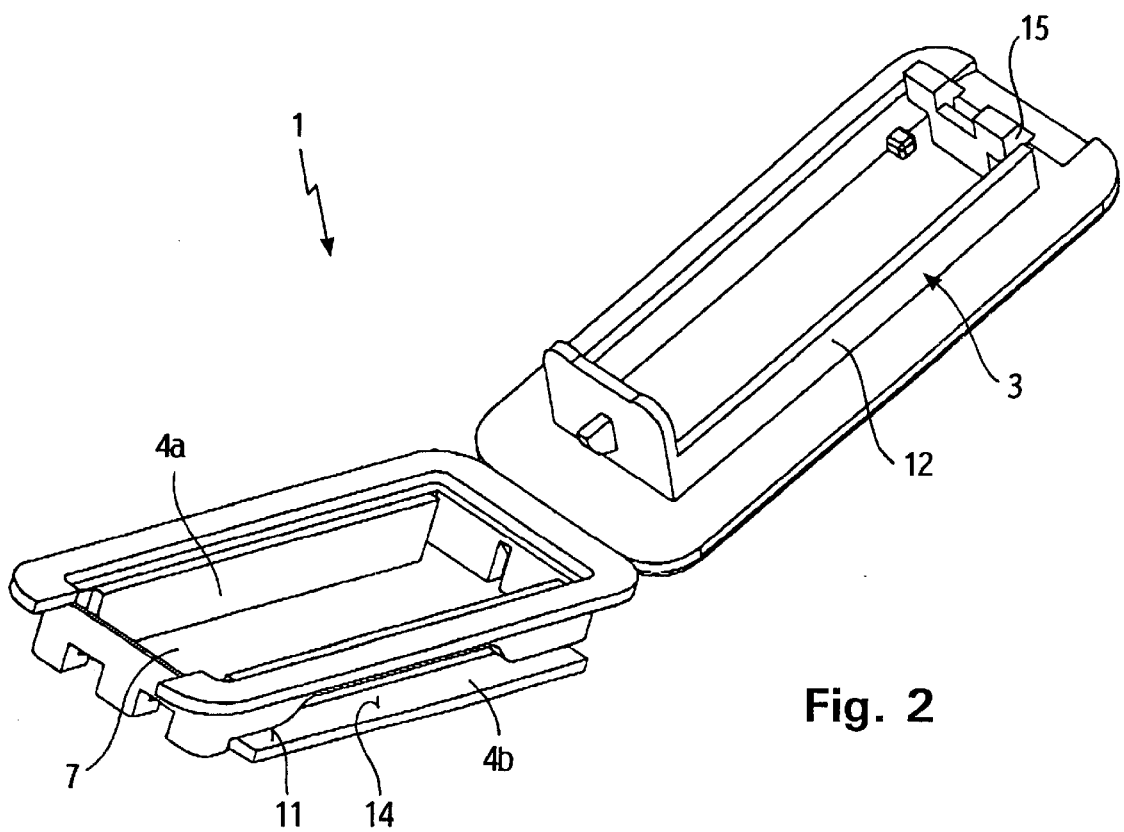
FIG. 2 shows the light housing of FIG. 1 with its pivot elements pivoted into their engaging installed position.

FIG. 1 shows the two pivot elements 4 in an inner pivot position in which their inner legs 4a penetrate into the frame opening 7 within the path of motion of the insert member 3. The insert member 3 abuts, when pivoted-in, with its side wall 9 on each upper side (abutment surface 10) of the pivot elements 4 such that same are pivoted in an outward direction away from the pivot position engaging into the path of motion until they each seat, in their end position (FIG. 2), with their outer leg 4b, on a stop surface 11 of the installation frame 2. In this end position, each inner leg 4a is parallel to a stop strip 12 of the insert member 3 to secure them against pivoting-back in the inward direction.

The opened light housing 1 (FIG. 1) is introduced from a forward position into an installation opening with the pivot elements 4 pivoted in until it seats with its front outer edge 13 on the wall of the installation opening. The light housing 1 is then closed by pivoting the illumination plate 5, wherein the pivot elements 4 are pivoted in an outward direction to each engage behind the wall, at a side (seating surface 14) of their outer leg 4b. Latch protrusions 15, disposed on the inner side of the illumination plate 5, engage behind the installation frame 2 to latch the illumination plate 5 to the installation frame 2 when the light housing 1 is closed.

We claim:

1. A housing for installation into an installation opening in an inside covering wall of a motor vehicle, the housing comprising:

an installation frame defining a frame opening, said frame for engagement into the installation opening from a front direction;

an insert member, said insert member for insertion into said frame opening from said front direction, said insert member having a first wall penetrating into said frame opening in a direction substantially perpendicular to the inside covering wall upon insertion of said insert member into said frame opening;

a first pivot element having an abutment leg and a seating leg, said abutment leg borne for pivoting on said installation frame, said abutment leg initially penetrating into said frame opening in a direction substantially parallel to the inside covering wall, said seating leg disposed in adjacent connection to said abutment leg and initially penetrating into said frame opening in a direction substantially perpendicular to the inside covering wall, wherein upon insertion of said insert member into said frame opening, said first wall abuts against said abutment leg to pivot said first pivot element into the installation opening, wherein said seating leg engages behind the covering wall to clamp the covering wall between said seating leg and said installation frame.

2. The housing of claim 1, wherein said insert member comprises a second wall extending opposite and substantially parallel to said first wall and further comprising a second pivot element having an abutment leg and a seating leg, said second pivot element abutment leg borne for pivoting on said installation frame at a location opposite to said first pivot element abutment leg, wherein upon insertion of said insert member into said frame opening said second wall abuts against said second pivot element abutment leg to pivot said second pivot element into the installation opening, wherein said second pivot element seating leg engages behind the covering wall to clamp the covering wall between said second pivot element seating leg and said installation frame.

3. The housing of claim 1, wherein said insert member is borne on said installation frame for pivoting.

4. The housing of claim 3, further comprising a first film hinge connected between said installation frame and said insert member.

5. The housing of claim 1, further comprising a second film hinge connected between said installation frame and said first pivot element.

6. The housing of claims 1, wherein said first pivot element has a first pivot element axis and said insert member has an insert member pivot axis, said first pivot element axis extending substantially at right angles with respect to said insert member pivot axis.

7. The housing of claim 1, further comprising a latch member for latching said insert member, moved into said frame opening, to said installation frame in a detachable fashion.

8. The housing of claim 1, wherein said housing is made from extruded components.

* * * * *